United States Patent
Sakai et al.

(10) Patent No.: US 7,240,597 B2
(45) Date of Patent: Jul. 10, 2007

(54) CIRCULAR SAW HAVING WIPER TIPS

(75) Inventors: Hisao Sakai, Fukuroi (JP); Yusuke Miyachi, Fukuroi (JP)

(73) Assignee: Tenryu Seikyo Kabushiki Kaisha (JP)

( * ) Notice: Subject to any disclaimer, the term of this patent is extended or adjusted under 35 U.S.C. 154(b) by 0 days.

(21) Appl. No.: 11/366,588

(22) Filed: Mar. 3, 2006

(65) Prior Publication Data

US 2006/0243115 A1    Nov. 2, 2006

(30) Foreign Application Priority Data

Apr. 28, 2005    (JP)    ............................. 2005-131220

(51) Int. Cl.
*B27B 33/02*    (2006.01)
(52) U.S. Cl. ....................................... 83/835; 144/218
(58) Field of Classification Search .................. 83/676, 83/835, 851–855, 847–848, 837; 144/218, 144/176, 240–241, 230, 223, 235
See application file for complete search history.

(56) References Cited

U.S. PATENT DOCUMENTS

| | | | | | |
|---|---|---|---|---|---|
| 3,176,455 | A | * | 4/1965 | Buchanan | .................... 56/295 |
| 3,299,917 | A | * | 1/1967 | Pearson | ........................ 83/837 |
| 3,344,822 | A | * | 10/1967 | Wilder | ......................... 83/837 |
| 3,521,684 | A | * | 7/1970 | McRobert et al. | ............ 83/837 |
| 3,700,016 | A | * | 10/1972 | Strobel | ......................... 83/848 |
| 3,730,038 | A | * | 5/1973 | Farb | ............................. 83/837 |
| 4,123,958 | A | * | 11/1978 | Wright et al. | ................. 83/837 |
| 4,214,499 | A | * | 7/1980 | Ellis | ............................. 83/855 |
| 2004/0200334 | A1 | * | 10/2004 | Souza et al. | .................. 83/835 |

* cited by examiner

*Primary Examiner*—Kenneth E. Peterson
*Assistant Examiner*—Phong Nguyen
(74) *Attorney, Agent, or Firm*—Rader, Fishman, & Grauer PLLC

(57) ABSTRACT

A circular saw including an annular disk-shaped base adapted to be driven about an axis of rotation, a plurality of tip supports formed along the outer circumference of the base integrally therewith so that a gullet is defined between adjacent ones of the tip supports, a plurality of tip inserts respectively fixed to the tip supports, a plurality of openings formed through the base on substantially the same circumference of a circle so as to be equally spaced apart from each other in the circumferential direction of the base, and a plurality of wiper tips respectively fixed to wall surfaces defining the openings on the downstream side of a rotational direction of the base. Each wiper tip has a front surface formed as a concave surface in cross section.

3 Claims, 9 Drawing Sheets

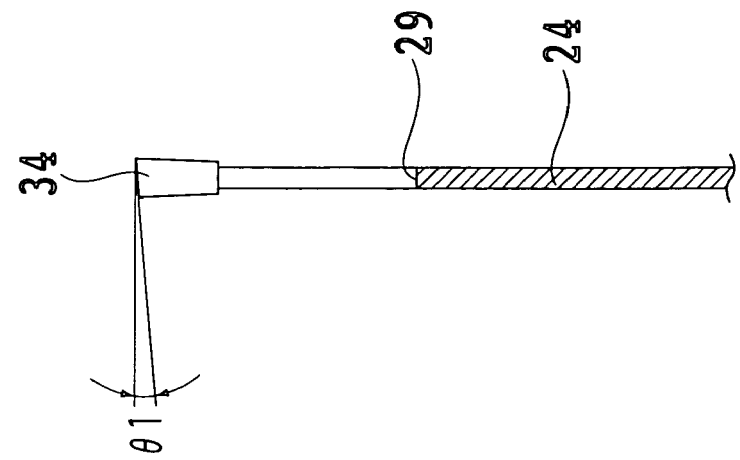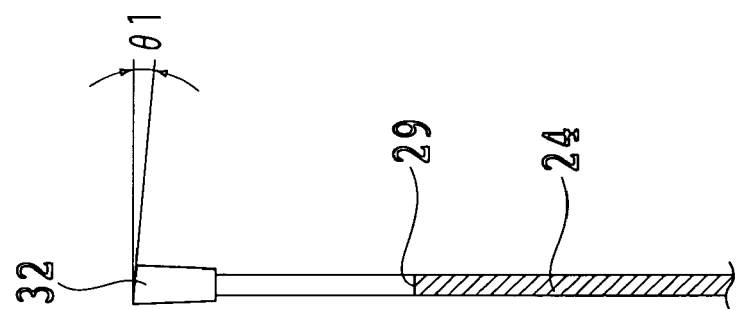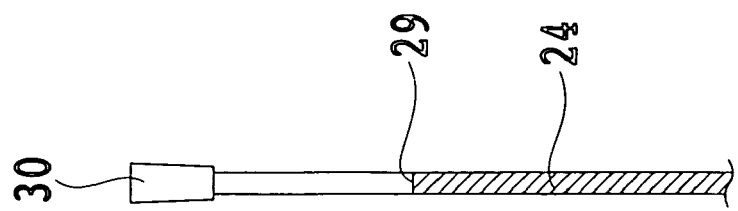

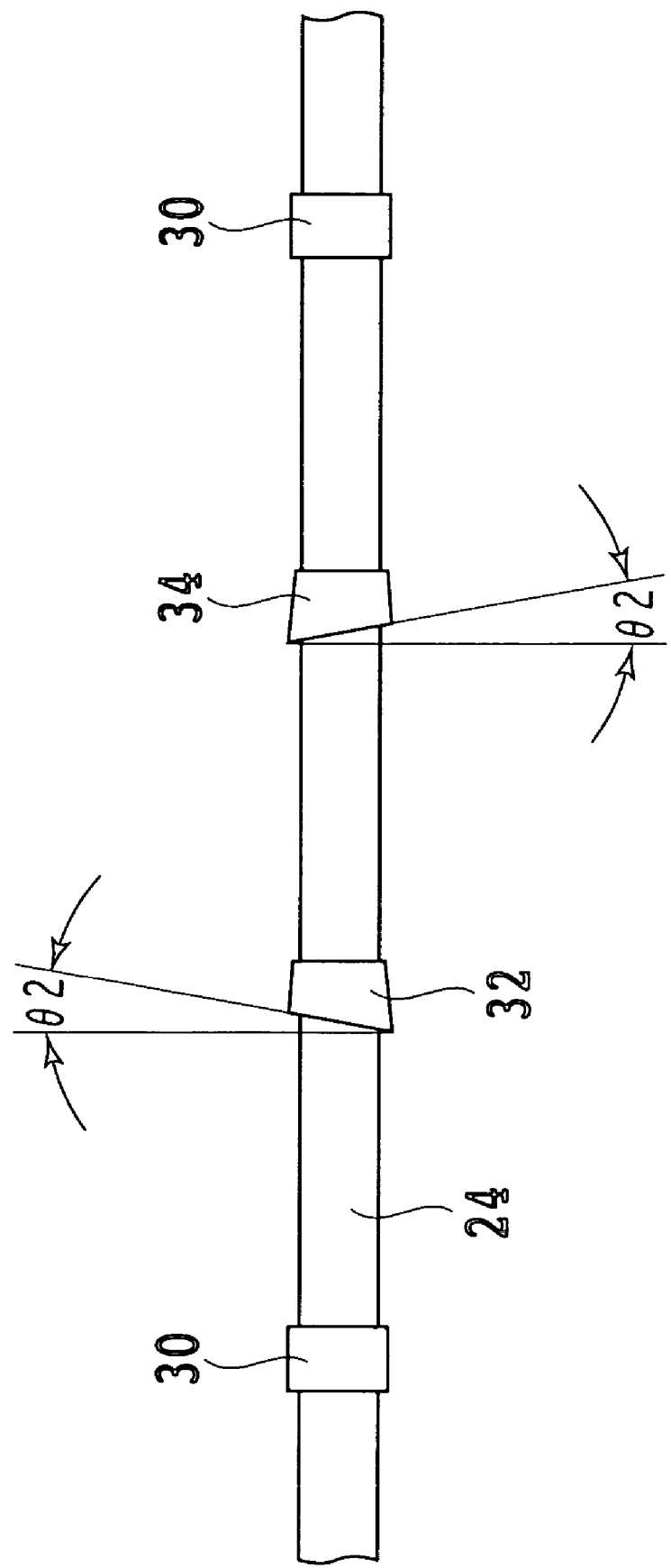

CIRCULAR SAW HAVING WIPER TIPS

BACKGROUND OF THE INVENTION

1. Field of the Invention

The present invention relates generally to a circular saw or disk cutter, and more particularly to a circular saw suitable for cutting of wood or a wood panel.

2. Description of the Related Art

A circular saw or disk cutter including a base disk having a plurality of tip supports arranged along the outer circumference and a plurality of hardened cutting tip inserts (cutter inserts) respectively fixed to the tip supports by brazing or the like is frequently used for cutting of wood or the like. The tip supports are spaced at given intervals in the circumferential direction of the base disk or annular disk-shaped base, and a gullet is defined between adjacent ones of the tip supports.

Each tip support has a recess, and each cutting tip insert is fixed in the recess of the corresponding tip support by brazing or the like. The base disk has a mounting hole at its central portion, and a rotating shaft of a rotary tool is inserted through the mounting hole of the base disk. The base disk is fastened to the rotating shaft by a bolt to thereby mount the circular saw to the rotary tool. Particularly in a circular saw for opening a hole through a wood panel or in a circular saw for lumbering, wiper tips are provided at a radially middle position of the base disk, so as to prevent the possibility that the circular saw may be tightened by cut surfaces formed in wood by the circular saw.

More specifically, pluralities of openings are formed through the base disk at a radially middle position so as to be equally spaced apart from each other in the circumferential direction of the base disk. The wiper tips are respectively fixed by brazing or the like to wall surfaces defining the openings on the downstream side of a rotational direction of the base disk. The wiper tips function to thinly cut or shave off the cut surfaces during a cutting operation by the tip inserts, thereby preventing the possibility that the circular saw may be tightened on the opposite side surfaces thereof by the cut surfaces. As a result, smooth cutting by the circular saw can be attained.

However, in the conventional circular saw for opening a hole through a wood panel or for lumbering, each wiper tip has a front surface formed as a flat surface in cross section. Accordingly, wood chips or shavings generated during the cutting operation may be scattered by the flat front surface of each wiper tip, and the chips thus scattered may intrude into the spaces between the side surfaces of each wiper tip and the cut surfaces of wood. As a result, the base disk may be tightened by the intrusion of the chips.

SUMMARY OF THE INVENTION

It is therefore an object of the present invention to provide a circular saw which can effectively prevent the intrusion of the chips.

In accordance with an aspect of the present invention, there is provided a circular saw including an annular disk-shaped base adapted to be driven about an axis of rotation; a plurality of tip supports formed along the outer circumference of the base integrally therewith so that a gullet is defined between adjacent ones of the tip supports; a plurality of tip inserts respectively fixed to the tip supports; a plurality of openings formed through the base on substantially the same circumference of a circle so as to be equally spaced apart from each other in the circumferential direction of the base; and a plurality of wiper tips respectively fixed to wall surfaces defining the openings on the downstream side of a rotational direction of the base; each of the wiper tips having a front surface formed as a concave surface in cross section.

Preferably, the plurality of tip inserts include a plurality of sets of tip inserts, each set of tip inserts including one plain tip insert and at least a pair of inclined tip inserts having oppositely inclined flanks with the same front edge oblique angle and oppositely inclined rakes with the same transverse rake angle.

More preferably, the circular saw further includes a plurality of expansion slits formed through the base at positions equally spaced apart from each other in the circumferential direction of the base so that each expansion slit opens to the bottom of the corresponding gullet; and a plurality of second wiper tips respectively fixed to wall surfaces defining all or selected ones of the plurality of expansion slits on the downstream side of the rotational direction of the base; each of the second wiper tips having a front surface formed as a concave surface in cross section.

According to the present invention, the front surface of each wiper tip is formed as a concave surface in cross section. Accordingly, the chips can be effectively collected in each opening by the front surface of each wiper tip, thereby suppressing the scattering of the chips. As a result, it is possible to suppress the intrusion of the chips into the spaces between the side surfaces of each wiper tip and the cut surfaces of a work material, thereby allowing smooth cutting by the circular saw.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 7A is a cross section taken along the line A-A in FIG. 6;

FIG. 7B is a cross section taken along the line B-B in FIG. 6;

FIG. 7C is a cross section taken along the line C-C in FIG. 6;

FIG. 8 is a view taken in the direction shown by an arrow D in FIG. 6; and

DETAILED DESCRIPTION OF THE PREFERRED EMBODIMENTS

Figure 1:
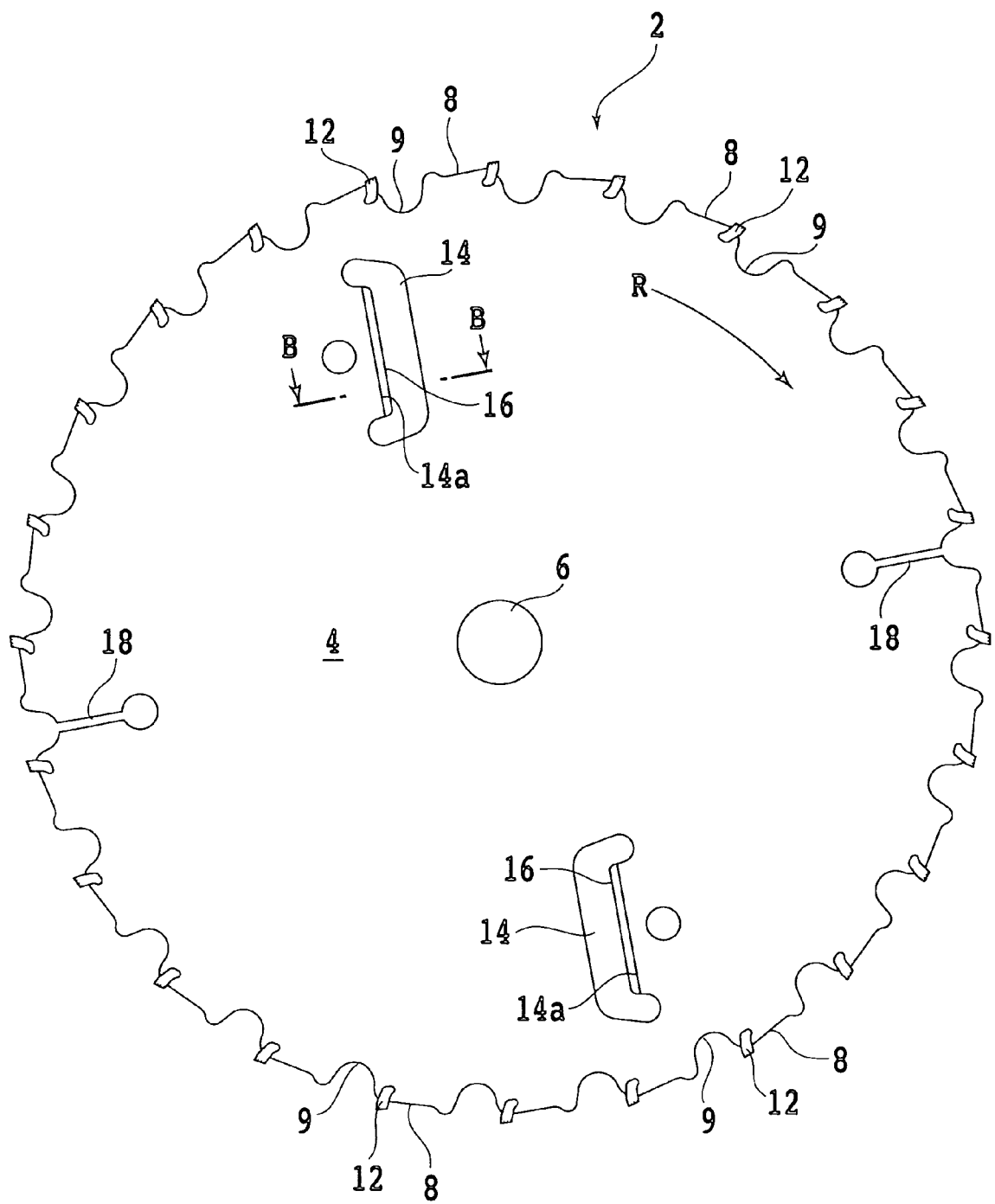
FIG. 1 is a side view of a circular saw according to a first preferred embodiment of the present invention.

Referring to FIG. 1, there is shown a side view of a circular saw or disk cutter 2 according to a first preferred embodiment of the present invention. The circular saw 2 is suitable especially for opening through a wall formed from a 2×4 wood panel. The circular saw 2 includes an annular disk-shaped base (base disk) 4 having a thickness of about 1.6 mm and a plurality of (e.g., 24) saw-toothed tip supports 8 formed along the outer circumference of the base disk 4 at pitch intervals. A gullet 9 is defined between adjacent ones of the tip supports 8. The base disk 4 is formed of steel such as JIS SKS5 (alloy tool steel), JIS SK5 (carbon tool steel), or JIS SK6 (carbon tool steel). The diameter of the base disk 4 is about 185 mm, for example, and the base disk 4 has a central hole 6 having a diameter of about 16 mm, for example. However, these values are merely illustrative, and the circular saw of the present invention is not limited to this preferred embodiment.

Figure 2:
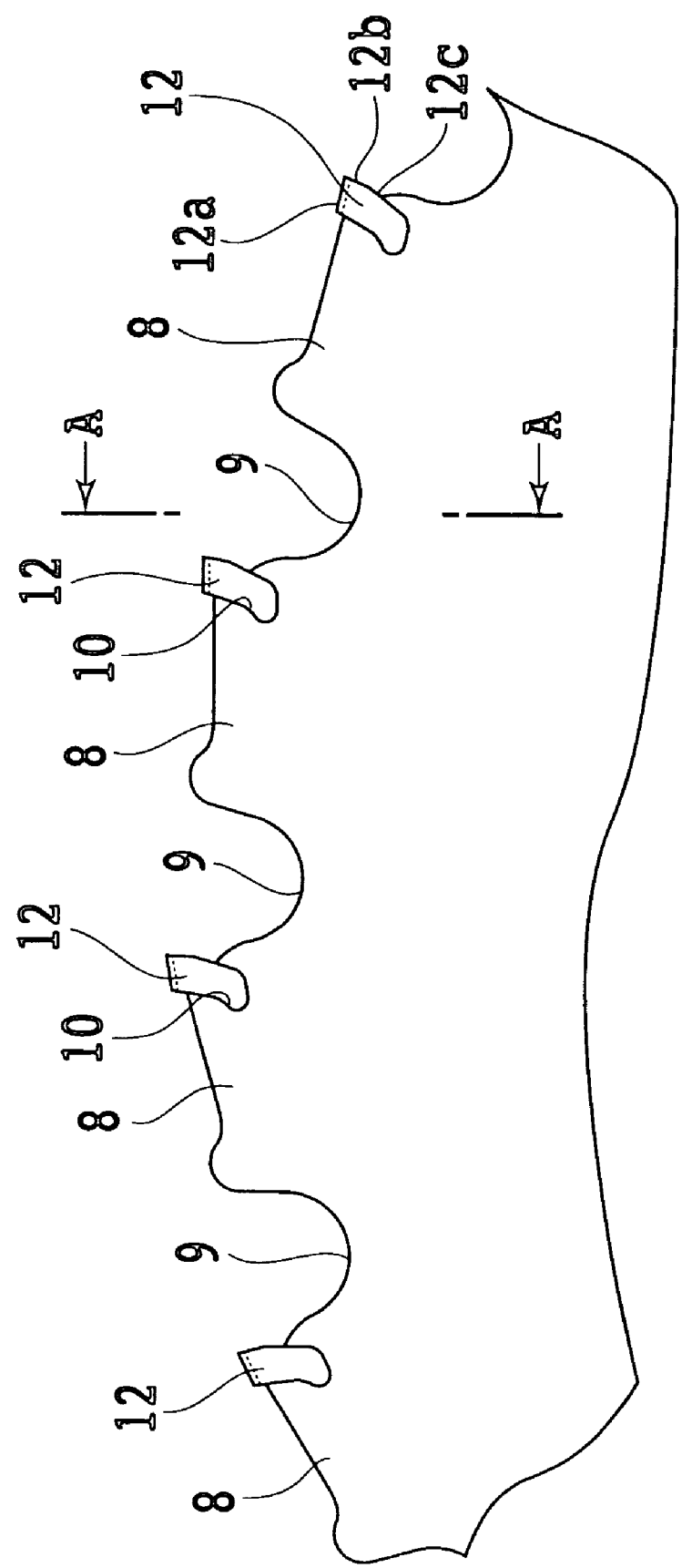
FIG. 2 is an enlarged view of a part of a portion of the circular saw according to a first preferred embodiment including tip inserts shown in FIG. 1.

As shown in FIG. 2, each tip support 8 is formed with a recess 10, and a plurality of tip inserts 12 are fixed in the recesses 10 of the plural tip supports 8 by brazing or the like. Each tip insert 12 is formed of a sintered carbide alloy composed of WC powder and Co powder. A pair of openings 14 are formed through the base disk 4 on substantially the same circumference of a circle at a radially middle position of the base disk 4 so as to be equally spaced apart from each other in the circumferential direction of the base disk 4. A wiper tip 16 is fixed by brazing or the like to a wall surface 14a defining each opening 14 on the downstream side of a rotational direction of the base disk 4.

Figure 3:
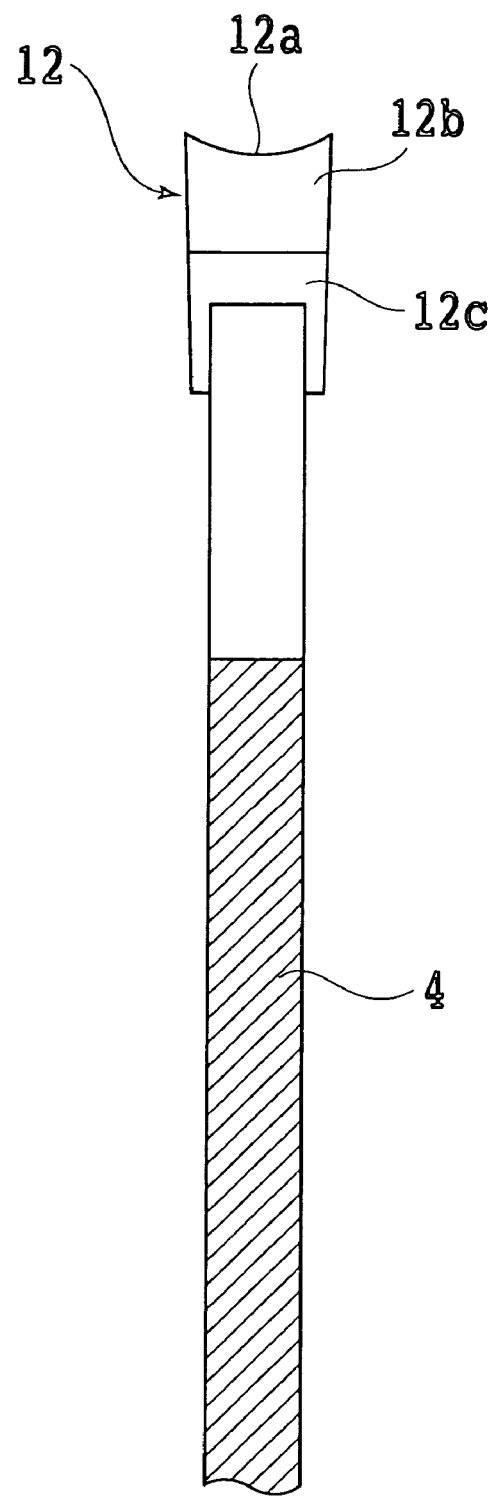
FIG. 3 is a cross section taken along the line A-A in FIG. 2.

As shown in FIGS. 2 and 3, each tip insert 12 has a flank 12a having a clearance angle of 12°, for example, a first face 12b having a first rake angle of 5°, for example, and a second face 12c having a second rake angle of 10°, for example. Further, as shown in FIG. 3, the flank 12a is formed as a concave surface having a radius of curvature of 3 mm, for example.

Figure 4:
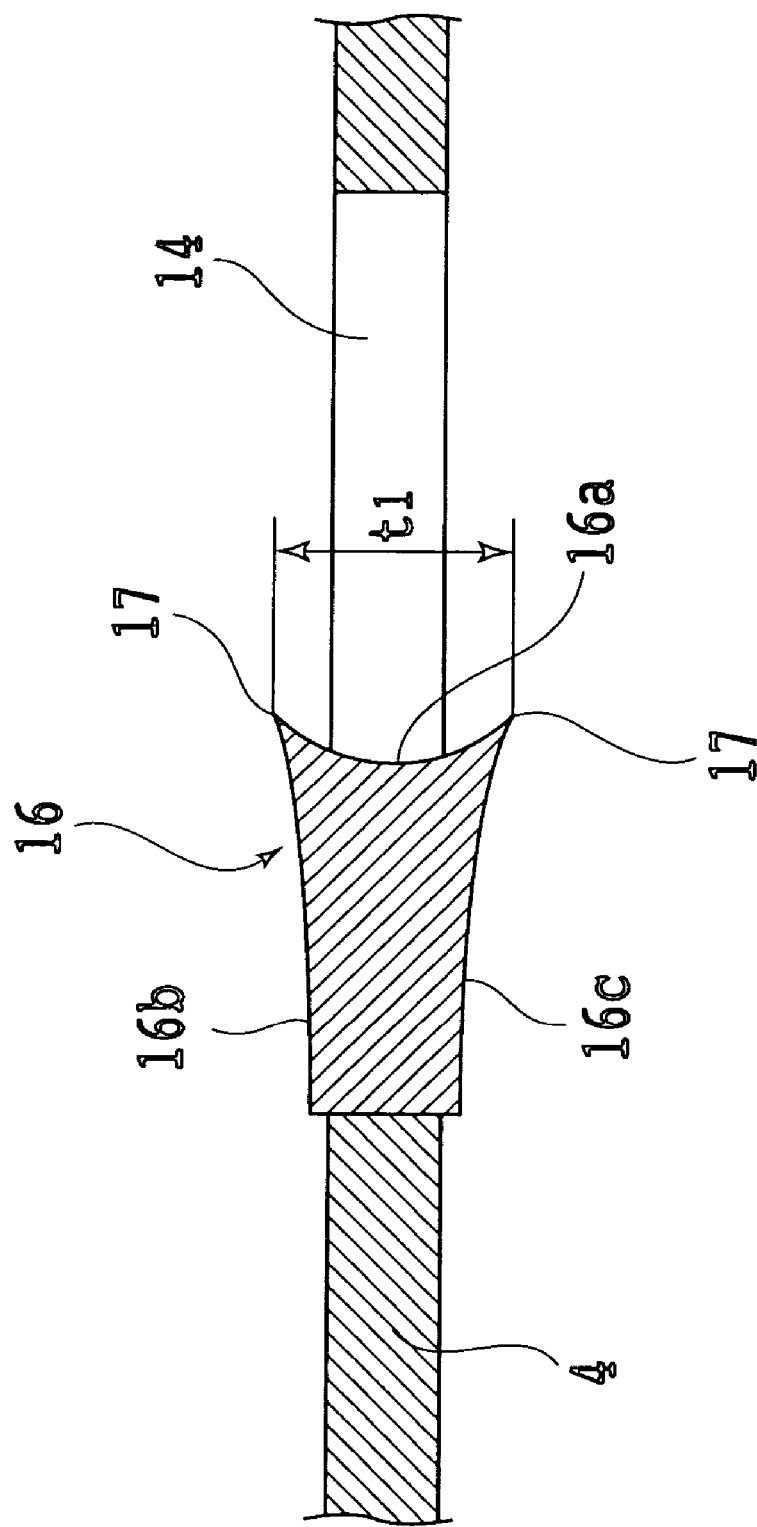
FIG. 4 is a cross section taken along the line B-B in FIG. 1.

As similar to each tip insert 12, each wiper tip 16 is formed of a sintered carbide alloy, for example, composed of WC powder and Co powder. As shown in FIG. 4 which is a cross section taken along the line B-B in FIG. 1, each wiper tip 16 has a front surface 16a formed as a concave surface in cross section and a pair of opposite side surfaces 16b and 16c formed as concave surfaces in cross section. The radius of curvature of the front surface 16a is 3 mm, for example, and the radius of curvature of each of the side surfaces 16b and 16c is 50 mm, for example. The thickness t1 of each wiper tip 16 at its front end is about 2.2 mm. Preferably, the formation of the front surface 16a of each wiper tip 16 is performed before brazing the wiper tip 16 to the wall surface 14a. Further, the formation of the side surfaces 16b and 16c of each wiper tip 16 is performed after brazing the wiper tip 16 to the wall surface 14a.

Further, the circular saw 2 according to this preferred embodiment has a pair of expansion slits 18 formed at positions spaced 90° apart from each opening 14 in the circumferential direction of the base disk 4. Each expansion slit 18 extends in the radial direction of the base disk 4 and opens to the bottom of the corresponding gullet 9. These expansion slits 18 function to absorb the thermal deformation of the circular saw 2 during the cutting operation thereof. In use, the circular saw 2 according to this preferred embodiment is mounted to a rotary tool by inserting the rotating shaft of the rotary tool through the central hole 6 and fastening the base disk 4 to the rotating shaft by a bolt. The circular saw 2 is rotated in the direction shown by an arrow R in FIG. 1, and it is used for opening through a wall formed from a 2×4 wood panel.

In the circular saw 2 according to this preferred embodiment, the cut surfaces of a work material can be thinly cut or shaved off by each wiper tip 16. Accordingly, tightening of the circular saw 2 by the cut surfaces due to a residual stress or the like can be suppressed. Further, since the front surface 16a of each wiper tip 16 is formed as a concave surface as shown in FIG. 4, sharp front edges 17 of each wiper tip 16 can be obtained to thereby improve a cutting performance. Moreover, the chips or shavings generated by each wiper tip 16 can be efficiently collected in the corresponding opening 14 to thereby suppress the scattering of the chips or shavings. As a result, it is possible to suppress the possibility that the chips or shavings scattered may be caught between the side surfaces of each wiper tip 16 and the cut surfaces opposed thereto, so that it is possible to prevent an increase in resistance to rotation of the circular saw 2 due to the chips or shavings caught as mentioned above.

Figure 5:
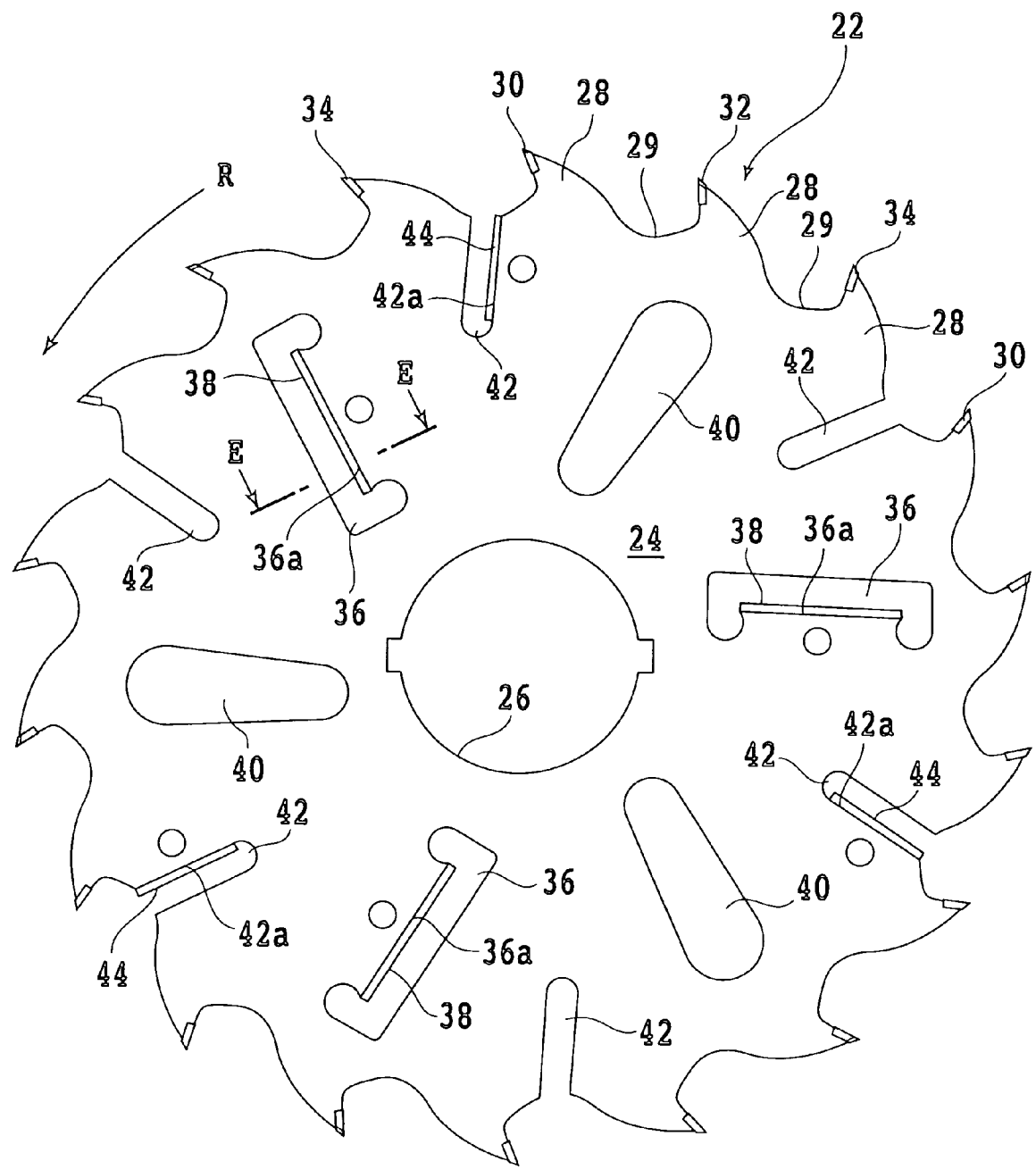
FIG. 5 is a side view of a circular saw according to a second preferred embodiment of the present invention.

Referring next to FIG. 5, there is shown a side view of a circular saw 22 according to a second preferred embodiment of the present invention. The circular saw 22 is used as a gang saw for lumbering, for example. The circular saw 22 includes an annular disk-shaped base (base disk) 24 having a thickness of about 2.2 mm and a plurality of (e.g., 18) saw-toothed tip supports 28 formed along the outer circumference of the base disk 24 at pitch intervals. A gullet 29 is defined between adjacent ones of the tip supports 28. The base disk 24 is formed of steel such as JIS SKS5 (alloy tool steel), JIS SK5 (carbon tool steel), or JIS SK6 (carbon tool steel).

The diameter of the base disk 24 is about 385 mm, for example, and the base disk 24 has a central hole 26 having a diameter of about 90 mm, for example. However, these values are merely illustrative, and the circular saw of the present invention is not limited to this preferred embodiment. Each tip support 28 is formed with a recess (not shown), and a plurality of sets of three tip inserts 30, 32, and 34 are fixed in the recesses of the plural tip supports 28. That is, each set of tip inserts 30, 32, and 34 is composed of a plain tip insert 30, a first inclined tip insert 32, and a second inclined tip insert 34.

Figure 6:
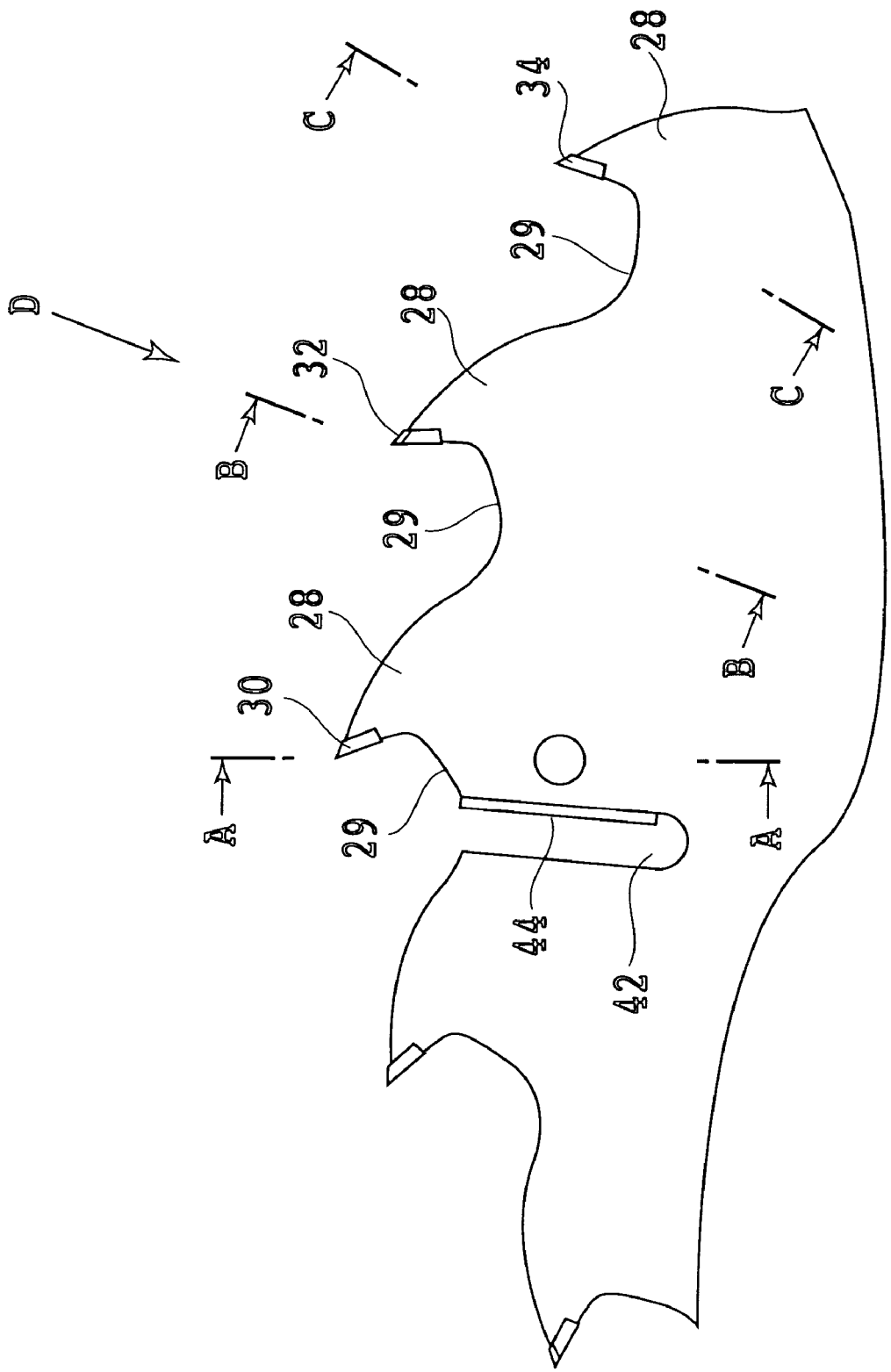
FIG. 6 is an enlarged view of a part of a portion of the circular saw according to a second preferred embodiment including tip inserts shown in FIG. 5.

FIG. 7A is a cross section taken along the line A-A in FIG. 6, FIG. 7B is a cross section taken along the line B-B in FIG. 6, and FIG. 7C is a cross section taken along the line C-C in FIG. 6. As shown in FIGS. 7B and 7C, the first and second inclined tip inserts 32 and 34 in each set have oppositely inclined flanks with the same front edge oblique angle $\theta 1$. The front edge oblique angle $\theta 1$ is set to 5°, for example. Further, as shown in FIG. 8 which is a view taken in the direction shown by an arrow D in FIG. 6, the first and second inclined tip inserts 32 and 34 in each set have oppositely inclined rakes with the same transverse rake angle $\theta 2$. The transverse rake angle $\theta 2$ is set to 5°, for example. Further, the front end of the plain tip insert 30 in each set is set lower by about 0.2 mm than the front ends of the first and second inclined tip inserts 32 and 34 in each set. Each of the tip inserts 30, 32, and 34 in each set has a cutting edge having a thickness of about 3.2 mm.

Figure 9:
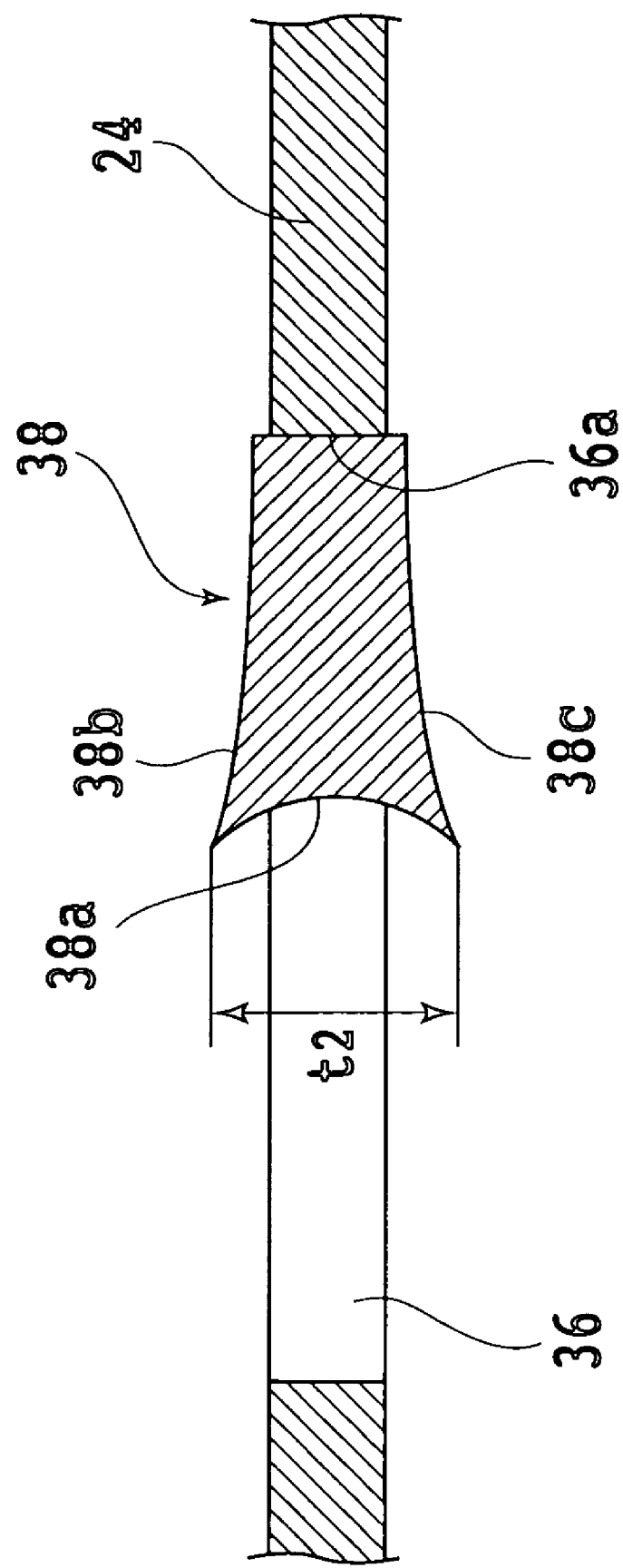
FIG. 9 is a cross section taken along the line E-E in FIG. 5.

Referring again to FIG. 5, three openings 36 are formed through the base disk 24 on substantially the same circumference of a circle at a radially middle position of the base disk 24 so as to be spaced 120° apart from each other in the circumferential direction of the base disk 24. A first wiper tip 38 is fixed by brazing or the like to a wall surface 36a defining each opening 36 on the downstream side of a rotational direction of the base disk 24. As similar to the tip inserts 30, 32, and 34 in each set, each first wiper tip 38 is formed of a sintered carbide alloy composed of WC powder and Co powder. As shown in FIG. 9 which is a cross section taken along the line E-E in FIG. 5, each first wiper tip 38 has a front surface 38*a* formed as a concave surface in cross section and a pair of opposite side surfaces 38*b* and 38*c* formed as concave surfaces in cross section.

Preferably, the formation of the front surface 38*a* of each first wiper tip 38 is performed before brazing the first wiper tip 38 to the wall surface 36*a*. Further, the formation of the side surfaces 38*b* and 38*c* of each first wiper tip 38 is performed after brazing the first wiper tip 38 to the wall surface 36*a*. The radius of curvature of the front surface 38*a* is 5 mm, for example, and the radius of curvature of each of the side surfaces 38*b* and 38*c* is 60 mm, for example. The thickness t2 of each first wiper tip 38 at its front end is about 2.6 mm.

Referring again to FIG. 5, three openings 40 are formed through the base disk 24 on substantially the same circumference of a circle as that of the openings 36 so that each opening 40 is spaced 60° apart from the adjacent openings 36 in the circumferential direction of the base disk 24. These openings 40 function to absorb the deformation of the base disk 24 of the circular saw 22 due to a temperature rise. The circular saw 22 further has six expansion slits 42 formed at positions spaced 60° apart from each other in the circumferential direction of the base disk 24. Each expansion slit 42 extends in a direction inclined about 10° from the radial direction of the base disk 24 and opens to the bottom of the corresponding gullet 29. These expansion slits 42 also function to absorb the deformation of the base disk 24 due to a temperature rise.

A second wiper tip 44 is fixed by brazing or the like to a wall surface defining each of three alternate ones of the six expansion slits 42 on the downstream side of the rotational direction of the base disk 24. Each second wiper tip 44 is formed of the same sintered carbide alloy as that of each first wiper tip 38, and has a sectional shape similar to that of each first wiper tip 38 as shown in FIG. 9. As a modification, the second wiper tips 44 may be fixed to all of the expansion slits 42.

The circular saw 22 according to this preferred embodiment is rotationally driven in the direction shown by an arrow R in FIG. 5. In use, a plurality of circular saws 22 are mounted in parallel on a rotary tool and suitably used as a gang saw for lumbering. When a wood panel is cut by the circular saw 22 according to this preferred embodiment, the cut surfaces of the wood panel are thinly cut or shaved off by the first and second wiper tips 38 and 44. Accordingly, it is possible to prevent the possibility that the circular saw 22 may be tightened by the cut surfaces to cause the hindrance to the rotation of the circular saw 22.

Furthermore, the front surface 38*a* of each first wiper tip 38 and the front surface of each second wiper tip 44 are formed as concave surfaces. Accordingly, the chips or shavings generated by the first and second wiper tips 38 and 44 can be efficiently collected in the openings 36 and the expansion slits 42, respectively. As a result, the scattering of the chips or shavings can be prevented to thereby suppress the possibility that the chips or shavings scattered may be caught between the side surfaces of each first wiper tip 38 and the cut surfaces and between the side surfaces of each second wiper tip 44 and the cut surfaces. Accordingly, possible braking to the rotation of the circular saw 22 due to the chips or shavings caught as mentioned above can be suppressed.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A circular saw comprising:

an annular disk-shaped base adapted to be driven about an axis of rotation and having a central hole disposed centrally about the axis of rotation;

a plurality of tip supports formed along an outer circumference of said base integrally so that a gullet is defined between adjacent ones of said tip supports;

a plurality of tip inserts respectively fixed to said tip supports;

a plurality of openings formed through said base on substantially the same circumference of a circle so as to be equally spaced apart from each other in the circumferential direction of said base, each opening defined by an opening wall surface forming a closed, continuous loop and disposed between and apart from the outer circumference of said base and the central hole, the opening wall surface having a first straight portion, a second straight portion facially opposing the first straight portion in a generally parallel manner with the first straight portion being shorter than the second straight portion, a pair of short straight portions disposed opposite one another with the first and second straight portions disposed therebetween and a pair of generally semicircular portions disposed opposite one another, respective ones of the pair of short straight portions interconnecting the second straight portion at opposing ends and respective ones of the pair of generally semicircular portions, the first straight portion interconnecting the pair of generally semicircular portions; and a plurality of wiper tips respectively fixed to respective ones of the first straight portions on the downstream side of a rotational direction of said base; wherein each of said wiper tips having a front surface formed as a concave surface in cross section.

2. The circular saw according to claim 1, further comprising:

a plurality of expansion slits formed through said base at positions equally spaced apart from each other in the circumferential direction of said base so that each expansion slit opens to the bottom of the corresponding gullet; and a plurality of second wiper tips respectively fixed to wall surfaces defining all or selected ones of said plurality of expansion slits on the downstream side of said rotational direction of said base; wherein each of said second wiper tips having a front surface formed as a concave surface in cross section.

3. The circular saw according to claim 1, wherein each respective one of the first straight portions extends along a first straight portion length and each respective one of the plurality of wiper tips extends along a wiper tip length, the first straight portion length is congruent to the wiper tip length.

* * * * *